May 20, 1941.　　　　G. R. GODBER　　　　2,242,671
CONSTRUCTION FOR ELECTRIC STORAGE BATTERIES
Filed Aug. 5, 1939　　　2 Sheets-Sheet 2
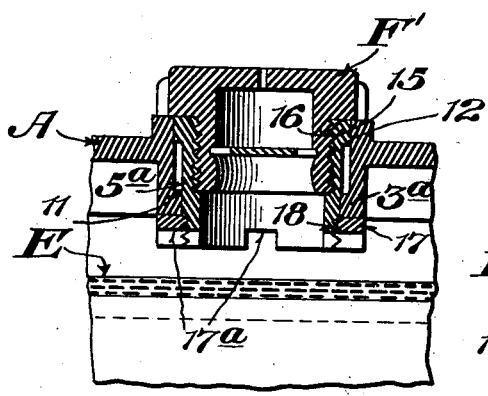
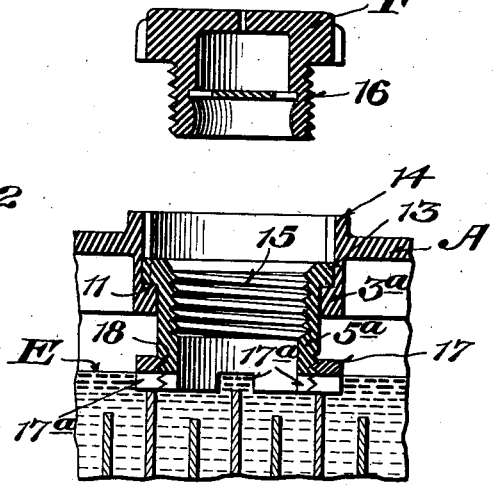
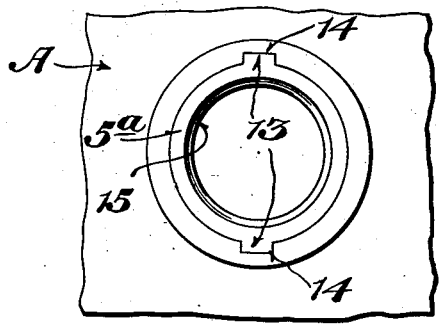
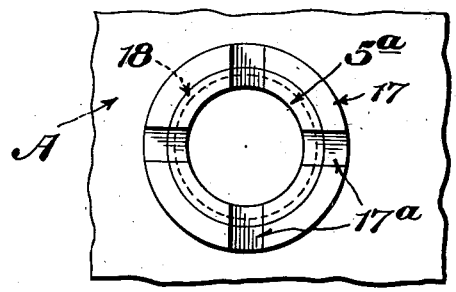
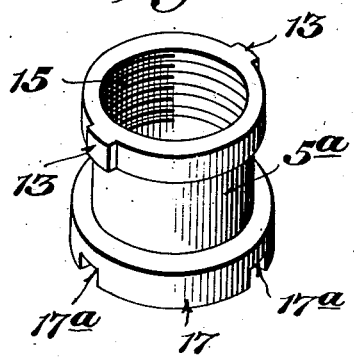
Inventor
George R. Godber,
By Wilhau... & Groff
Attorney Patented May 20, 1941

2,242,671

UNITED STATES PATENT OFFICE 2,242,671

CONSTRUCTION FOR ELECTRIC STORAGE BATTERIES

George R. Godber, Los Angeles, Calif.

Application August 5, 1939, Serial No. 288,665

4 Claims. (Cl. 136—178)

This invention relates to improvements in electric storage batteries, and has particular reference to means for determining and maintaining the proper electrolyte level in the cells of the battery.

It is of course generally known that it is necessary for the proper functioning of electric storage batteries to maintain the level of the electrolyte at the proper point in the cells at all times. If the electrolyte level is too low and the tops of the plates are exposed, the plates quickly deteriorate and reduce the capacity of the battery while at the same time shortening its life. On the other hand too much electrolyte results in much of the surplus being lost due to gassing of the battery while on charge, splashing, and capillary action. This loss of electrolyte and its subsequent replacement with distilled water lowers the gravity of the remaining electrolyte in the cell and cuts down the power and capacity of the battery. Moreover, excess electrolyte escaping through the vent corrodes the battery carrier and teminals, and, in the case of batteries installed under the hood, the ignition cables, coils, etc., are frequently ruined by escaping acids. For these reasons, it is of paramount importance that the electrolyte level be accurately controlled at all times regardless of where the battery may be installed.

Accordingly, a primary object of the invention is to provide a construction which not only maintains the electrolyte at the proper level within the cells but at the same time prevents overfilling. Briefly, the invention includes a sleeve provided with spaced abutments or lugs at its lower end and which is interlocked with the vented filler cap in such a way that when the cap is in position the sleeve is elevated to vent the space between the electrolyte and the underside of the cover, while on the other hand, when the cap is removed for filling purposes the sleeve is permitted to drop down into the battery so that the spaced abutments or lugs rest on top of the plates or separators, whereby the lower sealing edge of the sleeve may determine the electrolyte level above the separators. When the cell is then filled, the water or electrolyte may back up into the sleeve to serve as a signal to the servicing party that sufficient liquid has been supplied. The filling of the sleeve is due to the fact that, the sleeve, in its lowered position, serves to trap air in the top of the cell so that after the filling liquid has displaced sufficient air, additional liquid will back up in the sleeve, thus showing that the cell has been sufficiently supplied. When the cap is again screwed into place, the sleeve is automatically lifted thus raising its lower edge above the established electrolyte level and permitting the small quantity of liquid remaining in the sleeve, after filling, to drain back in the cell, and venting the cell as previously explained.

A further object of the invention is to provide novel forms of embodying the foregoing features into practical and efficient structures.

With the above and other objects in view which will more readily appear as the nature of the invention is better understood, the same consists in the novel construction, combination, and arrangement of parts hereinafter more fully described, illustrated and claimed.

A preferred and practical embodiment of the invention is shown in the accompanying drawings, in which:

Figure 1 is a vertical cross-sectional view of a cell cover embodying the present construction.

Figure 2 is a vertical cross-sectional view taken on the line 2—2 of Figure 1.

Figure 3 is a top plan view of the construction shown in Figure 1 with the cap removed.

Figure 4 is a perspective view of the filler sleeve.

Figure 5 is a vertical cross-sectional view of a cell cover showing a modified form of filler sleeve construction.

Figure 6 is a vertical cross-sectional view taken at right angles to the section shown in Figure 5.

Figure 7 is a top plan view of the construction shown in Figure 5 with the filler cap removed.

Figure 8 is a bottom plan view of the structure shown in Figs. 5 to 7; and

Figure 9 is a detail perspective view of the modified filler sleeve shown in Figures 5 to 8.

Similar reference characters designate corresponding parts throughout the several figures of the drawings.

According to the embodiment shown in Figures 1–4 of the drawings, a threadless cell cover is employed, the same being designated generally as A. This cell cover carries the usual terminal elements B and is provided with a suitable boss 1 having the filler opening 2 therein. The underside of the cell cover A is provided with a downwardly extending collar 3 which opens into the electrolyte space of the cell. The plates or separators of the cell are designated generally as 4 and are covered with electrolyte E in the usual manner. The side wall of the collar 3 is imperforate and therefore the same is only open at its lower end. The said collar 3 has its inner diameter coinciding with the diameter of the filler opening 2, thereby to receive an adjustable filler sleeve 5. This sleeve is of annular formation and is provided on its outer face with a rib 6 slidably mating with a groove 7 in the inside face of the collar so that the sleeve may move longitudinally within the collar 3 but cannot rotate therein. The lower end of the sleeve 5 is open and the bottom edge portion thereof is provided with the offset lugs or abutments 8 which are intended to rest on the top of the plates or separators 4 when the sleeve is separated from the filler cap F as shown in Figure 1 to determine the electrolyte level above the tops of the separators.

The filler cap F is of conventional vented type having a screw-threaded plug portion 9 adapted to enter the screw threads 10 formed on the interior of the sleeve 5. In connection with the lugs 8 it may be pointed out that the vertical height or depth thereof determines the amount the electrolyte level will rise above the separators. Moreover, it may be pointed out that these lugs are offset so that they limit the upward movement of the sleeve 5 when it is pulled upward into the collar by the manipulation of the filler or vent cap F. In other words, the lugs 8 will engage the bottom of the collar 3 when the parts are in the position shown in Figure 2.

In practice, the threadless cover A is assembled in the cell and suitably sealed thereto as at X, with the vent cap F in place so that the sleeve 5 will not fall into the cell. After the battery elements, including the plates 4 and said cover are assembled in the battery container, the vent cap F may be removed and the sleeve will drop down, due to its own weight, and the spaced abutments 8 rest on the tops of the separators 4 as shown in Figure 1. As electrolyte or distilled water is added, either on the original filling or upon subsequent fillings, through the opening 2, the fluid level rises throughout the cell until it reaches the bottom edge of the sleeve 5 after which it must rise in the tube formed by the sleeve 5 and the collar 3 due to air being trapped under the underside of the cell cover, and thereby forcing the liquid up into the tube. Filling should be stopped at this point as the cover and its elements are so designed and proportioned that the proper amount of electrolyte is in the cell when the fluid level reaches the bottom of the sleeve 5 and starts to rise within it. If filling is continued beyond this point, the fluid will continue to rise within the closed tube but not in the cell itself. Insertion of the plug 9 of the vent or filler cap into the opening 2 will cause the plug to engage the threads 10 on the sleeve and by turning the cap in the proper direction the sleeve is elevated or raised until the lower edge of the sleeve is raised above the electrolyte level in the cell. When the sleeve 5 is completely elevated the entire surface of the electrolyte E will be vented upwardly through the sleeve and out of the usual opening in the vent cap to the atmosphere. Any electrolyte or fluid left within the sleeve by overfilling can then drain back into the cell due to the release of the trapped air under the cell cover.

According to the modification shown in Figures 5-8, inclusive, the same essential features as described in connection with Figures 1-4 are preserved.

By referring to Figure 5 it will be observed that the upper portion of the interior of the collar 3ª is of greater diameter than the lower portion thereby to provide the interior of the collar with an annular supporting shoulder 11. The sleeve 5ª on the other hand has its upper edge portion of larger diameter than its lower portion thereby to provide an annular stop shoulder 12. Thus, it will be apparent that the ultimate limit of downward travel of the sleeve 5ª in the collar 3ª is defined by the engagement of the shoulders 11 and 12 as well as by the separator plates. Relative rotary movement between the sleeve 5ª and the collar 3ª is prevented by one or more ribs 13 on the outer surface of the sleeve 5ª slidably engaging in suitable guide grooves 14 on the interior of the collar 3ª.

The upper end of the sleeve 5ª is interiorly threaded as at 15 to receive the externally threaded plug portion 16 of the vented filler cap F'. The lower outer surface of the sleeve 5ª is intended to receive an abutment ring 17. This ring may be held to the lower portion of the sleeve 5ª by the threads 18 or the like engaging threads on the lower portion of the sleeve, and as will also be observed from Figures 5, 6 and 8 the ring 17 is provided with a plurality of notches 17ª which register with corresponding notches formed inwardly of the bottom edge of the sleeve 5ª thereby to provide a plurality of spaced abutments or lugs whose lower faces engage the tops of the separator plates while the tops of the intervening notches define the lower sealing edge of the sleeve.

Figure 5 illustrates the relative position of parts when the battery is in use or when it is being charged. Figure 6 illustrates the position of parts when the cell is to be filled. When the cell is to be filled it will be apparent that the vented filler cap F' is rotated so as to unscrew the plug 16 from the threads 15 of the sleeve. The sleeve will thereby drop until the shoulders 11 and 12 respectively on the collar 3ª and the sleeve engage. The lower edge of the sleeve 5ª which constitutes the mouth thereof determines the level of electrolyte within the cell when the sleeve is in its dropped or lowered position as shown in Figure 6. When the filler cap is removed and the sleeve is in its lowered position water or electrolyte may be supplied to the cell through the sleeve and when the electrolyte level reaches the tops of the notches 17ª, additional liquid supplied will rise into the sleeve 5ª. When the filler cap F' is replaced so that the plug 16 engages with the threads 15 and the cap is rotated in the proper direction, the sleeve 5ª will be lifted until the ring 17 engages the bottom edge of the collar 3ª. Any liquid remaining in the sleeve 5ª will drain back into the cell and the entire space above the electrolyte will be vented to the atmosphere through the vented filler cap F', in the same manner as described in connection with the construction shown in Figures 1 and 2.

In connection with the notched ring 17 on the sleeve 5ª, it may be pointed out that this sleeve is adjusted so as to touch the separators of the battery when the sleeve is down in the same way as the lugs 8 on the sleeve 5. Thus, the tops of the notches 17ª which define spaced abutments uniformly determine the height of the liquid above the tops of the separators.

The sleeve 5 in Figure 1 and the sleeve 5ª may be made of lead or any suitable acid-proof material.

From the foregoing it will be apparent that in both forms of the invention it is proposed to provide a sleeve for controlling the level of electrolyte in the cell which may be manipulated by the simple act of removing and replacing the vented filler cap. In both constructions the level of electrolyte within the cell will be effectively determined, and overfilling is impossible. When the filler caps are replaced the contents of each cell are properly vented through the vented filler caps and the disadvantages incident to overfilling are entirely overcome. Another advantage of the present construction resides in the fact that the cover A is provided with a threadless filling opening 2. The formation of the thread on the cover is a more or less expensive operation, but this expense is avoided in the present invention because it is a comparatively simple matter to provide the sleeve 5 with interior threads 10 or 15. In connection with these threads which receive the threaded plug portion of the vented filler cap, it will, of course, be understood that when the filler cap is rotated, in a direction to be removed, the threads on the plug and the sleeve cooperate to push or force the sleeve downwardly. In other words, while the sleeve in both forms of the invention may drop by gravity, nevertheless, the interengaging threads on the plug and sleeve insure the movement of the sleeve in the event that corrosion exists thereby insuring the positive dropping of the sleeve to insure filling to the desired level.

Without further description, it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. In an electric storage battery, a casing, plates therein, a cover having a filling opening, a vertically movable sleeve fitting substantially air tightly in said filling opening and movable by gravity downwardly to a position in which it rests at its bottom on the upper edges of said plates and upwardly to a position in which its bottom is spaced above the upper edges of said plates, said sleeve having a side opening through which liquid may flow into the casing, the top of said opening being disposed a definite distance above the bottom of said sleeve to predetermine the level to which the casing may be filled with liquid when said sleeve is resting at its bottom upon the upper edges of said plates, means holding said sleeve against rotation, means limiting upward movement of said sleeve, and a vented closure cap having threaded connection with said sleeve and engagement with said cover outwardly of said filling opening, whereby upon rotation of said cap in one direction it raises the sleeve to its limit of upward movement to permit free gassing of the battery and then becomes tightened, and, upon rotation in the opposite direction and removal from the sleeve it releases the sleeve for downward movement to rest at its bottom upon the upper edges of the plates and uncovers the sleeve to permit liquid to be supplied therethrough to the casing.

2. In an electric storage battery, a casing, plates therein, a cover having a filling opening, a depending collar surrounding said opening, a vertically movable sleeve fitting substantially air tightly in said filling opening and movable downwardly to a position in which it rests at its bottom on the upper edges of said plates and upwardly to a position in which its bottom is spaced above the upper edges of said plates, said sleeve having a side opening below the bottom of said collar through which liquid may flow into the casing when said sleeve is resting at its bottom upon the upper edges of said plates, the top of said opening being disposed a definite distance above the bottom of said sleeve to predetermine the level to which the casing may be filled with liquid when said sleeve is resting at its bottom upon the upper edges of said plates, means holding said sleeve against rotation, means extending outwardly from said sleeve below said collar for engagement with the lower end of said collar to limit upward movement of said sleeve, and a vented closure cap having threaded connection with said sleeve and engagement with said cover outwardly of said filling opening, whereby upon rotation of said cap in one direction it raises the sleeve to its limit of upward movement to permit free gassing of the battery and then becomes tightened and upon rotation in the opposite direction and removal from the sleeve it releases the sleeve for downward movement to rest at its bottom upon the upper edges of the plates and uncovers the sleeve to permit liquid to be supplied therethrough to the casing.

3. An electric storage battery as set forth in claim 2 in which the means extending outwardly from the sleeve for engagement with the lower end of the collar to limit upward movement of the sleeve comprises a ring threaded on the lower end portion of the sleeve, and in which the sleeve and said ring have alined recesses for flow of liquid from the sleeve into the casing and the tops of which recesses predetermine the level to which liquid may rise in the casing during filling of the battery when the sleeve is in its lower position resting at its bottom on the upper edges of the plates.

4. An electric storage battery as set forth in claim 1 including cooperating means on the cover and the sleeve to limit downward movement of the sleeve relative to the cover and thus insure maintenance of the sleeve at all times in assembly with the cover.

GEO. R. GODBER.